Patented Sept. 9, 1941

2,255,434

UNITED STATES PATENT OFFICE 2,255,434

ARYLOXY-TETRAHYDRONAPHTHALENES

Clarence L. Moyle, Midland, Mich., assignor to The Dow Chemical Company, Midland, Mich., a corporation of Michigan No Drawing. Application January 18, 1940, Serial No. 314,469

8 Claims. (Cl. 260—612)

This invention relates to certain new substitution products of tetrahydronaphthalene having the general formula

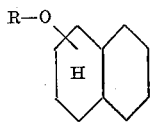

wherein R represents an aromatic radical of the benzene series. Examples of such compounds are ac-phenoxy-tetrahydronaphthalene, ac-(4-xenoxy)-tetrahydronaphthalene, ac-(alpha-naphthoxy)-tetrahydronaphthalene, ac-(o-toloxy)-tetrahydronaphthalene, ac-(4-chlorophenoxy)-tetrahydronaphthalene, ac - (3 - isopropylphenoxy)-tetrahydronaphthalene, ac-(2,4,6-trichlorophenoxy)-tetrahydronaphthalene, ac-thymoxy-tetrahydronaphthalene, etc.

The new compounds having the above general formula are usually obtained in the form of stable, high-boiling liquids or crystalline solids which are soluble in a variety of common organic solvents, such as ethanol, benzene, acetone, etc., but substantially insoluble in water. They are useful as plasticizing agents, being compatible with many synthetic plastic materials such as polystyrene and other vinyl resins, cellulose ethers, etc., and may also be employed as heat transfer agents and as intermediates in the manufacture of other organic chemicals.

The ac-aryloxy-tetrahydronaphthalenes of the present class may be prepared by heating a metal salt of a phenol (or a mixture of an aqueous or alcoholic alkali and a phenol), such as phenol, naphthol, m-phenylphenol, 2,4-dimethyl-phenol, 2,4,6-tribromophenol, 4-tertiaryoctyl-phenol, 4-bromophenol, 2-methoxy-phenol, 4-tertiarybutyl-2-phenylphenol, etc., with an ac-mono-halo-tetrahydronaphthalene. The latter product is readily prepared by halogenating 1,2,3,4-tetrahydronaphthalene in such manner halogenation takes place in the acyclic nucleus, whereby there is obtained a mixture comprising 1- and 2-monohalo-1,2,3,4-tetrahydronaphthalenes. While such mixture may be separated and either of the isomers reacted with a phenol according to the invention to prepare the corresponding aryloxy derivative, I prefer to employ the mixture directly, thereby obtaining a mixed product comprising 1- and 2-aryloxy-1,2,3,4-tetrahydronaphthalenes. Such mixed product is usually more satisfactory for use as a plasticizing agent or heat transfer medium than either of its pure components because of its lower freezing point.

The reaction for the formation of the new products is preferably carried out by dissolving the phenol metal salt, or a mixture of the phenol and an approximately equimolecular proportion of an alkali metal hydroxide, in ethanol or other suitable solvent, and thereafter heating the resultant solution at reflux temperature with an approximately equimolecular proportion of the ac-mono-halo-tetrahydronaphthalene. The reaction is usually complete in from 2 to 10 hours depending upon the particular reactants employed. Upon completion of the reaction, the mixture is cooled, washed with water to remove inorganic halide and any unreacted alkali metal hydroxide, and the product is purified by fractional distillation under vacuum.

The following examples illustrate several ways in which the principle of the invention has been applied but are not to be construed as limiting the same:

Example 1

1,2,3,4-tetrahydronaphthalene was chlorinated at a temperature of about 80° to 85° C. in the presence of ascaridole as a catalyst whereby there was obtained a mixture of 1- and 2-chloro-1,2,3,4-tetrahydronaphthalenes which distilled at approximately 104° to 112° C. under 6.5 millimeters pressure and had a specific gravity of about 1.12 at 25°/20° C. A mixture of 83.3 grams (0.5 mol) of this material and 96 grams (0.5 mol) of sodium 2-phenyl-phenate was dissolved in approximately 160 grams of ethyl alcohol and the resulting solution was heated at reflux temperature for 2½ hours. The reaction mixture was then diluted with water and the insoluble organic portion was washed with dilute aqueous sodium hydroxide and distilled, whereby there was obtained a mixture of ac-(2-xenoxy)-tetrahydronaphthalenes, a very viscous yellow oil distilling at approximately 200° to 229° C. under 4.5 millimeters pressure and having a specific gravity of about 1.12 at 60°/20° C. The ac-(2-xenoxy)-tetrahydronaphthalenes have the formula

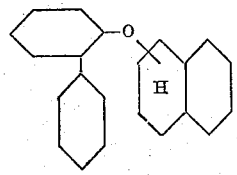

Example 2

75 grams (0.5 mol) of 4-tertiarybutyl phenol was dissolved in an alcoholic alkali solution prepared by dissolving 20.8 grams (0.5 mol) of sodium hydroxide in approximately 160 grams of 93 per cent ethanol. The resulting solution was mixed with 83.3 grams (0.5 mol) of ac-chloro-tetrahydronaphthalene and the mixture was heated at reflux temperature with stirring for 3 hours. The crude reaction product was then diluted with hot water and the insoluble organic portion was washed with dilute aqueous sodium hydroxide and distilled. The distilled product, consisting of a mixture of ac-(4-tertiarybutyl-phenoxy)-tetrahydronaphthalenes, was a very viscous yellow oil which distilled at approximately 190° to 197° C. under 4 millimeters pressure and had a specific gravity of about 1.05 at 60°/25° C. The ac-(4-tertiarybutyl-phenoxy)-tetrahydronaphthalenes have the formula

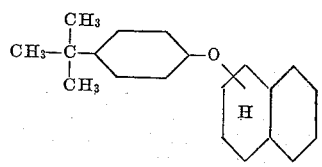

*Example 3*

90 grams (0.7 mol) of 4-chlorophenol was dissolved in a solution of 31.3 grams (0.75 mol) of sodium hydroxide in approximately 80 grams of 93 per cent ethanol. The resulting solution was then mixed with 116.5 grams (0.7 mol) of ac-chloro-tetrahydronaphthalenes and heated at reflux temperature for 3 hours. The reaction mixture was diluted, washed, and distilled as in Example 1, whereby there was obtained a mixture of ac-(4-chlorophenoxy)-tetrahydronaphthalenes, a yellow oil distilling at approximately 185° to 200° C. under 4 millimeters pressure and having a specific gravity of about 1.19 at 25°/20° C. The ac-(4-chlorophenoxy)-tetrahydronaphthalenes have the formula

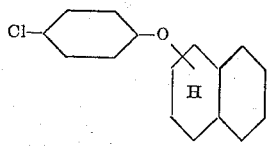

*Example 4*

255 grams (2.2 mols) of sodium phenate was gradually added to 403 grams (2.4 mols) of ac-chloro-tetrahydronaphthalenes over a period of ½ hour, during which time the temperature of the mixture rose from 23° C. to 74° C. The mixture was then heated with stirring at 60° to 80° C. for 7 hours, and was thereafter diluted with water. The water-insoluble portion which separated was washed with water and distilled, whereby a mixture of ac-phenoxy-tetrahydronaphthalenes was obtained as a viscous yellow oil distilling at 197° to 220° C. under 8 millimeters pressure. The ac-phenoxy-tetrahydronaphthalenes have the formula

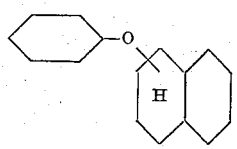

Other modes of applying the principle of my invention may be employed instead of those explained, change being made as regards the method herein disclosed or the materials employed,
provided the products stated by any of the following claims or the equivalent of such stated products be obtained.

I claim:

1. An ac-aryloxy-tetrahydronaphthalene having the general formula

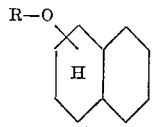

wherein R represents an aromatic radical of the benzene series.

2. An ac-aryloxy-tetrahydronaphthalene having the general formula

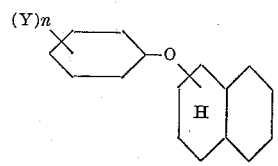

wherein Y represents a substituent selected from the class consisting of alkyl and aryl radicals, hydrogen and halogen, and $n$ represents an integer not greater than 3.

3. An ac-aryloxy-tetrahydronaphthalene having the general formula

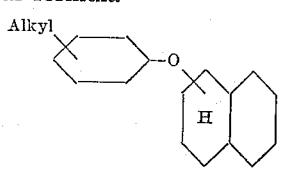

4. An ac-aryloxy-tetrahydronaphthalene having the general formula

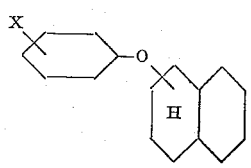

wherein X represents halogen.

5. An ac-aryloxy-tetrahydronaphthalene having the general formula

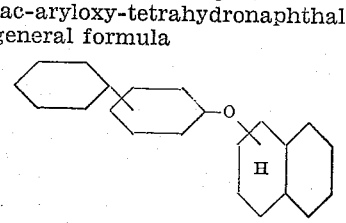

6. A mixture of isomeric ac-(2-xenoxy)-tetrahydronaphthalenes, said mixture being a viscous yellow liquid distilling at approximately 200° to 229° C. under 4.5 millimeters pressure and having a specific gravity of about 1.12 at 60°/20° C.

7. A mixture of ac-(4-tertiarybutyl-phenoxy)-tetrahydronaphthalenes, said mixture being a viscous yellow liquid distilling at approximately 190° to 197° C. under 4 millimeters pressure, and having a specific gravity of about 1.05 at 60°/25° C.

8. A mixture of ac-(4-chlorophenoxy)-tetrahydronaphthalenes, said mixture being a yellow liquid distilling at approximately 185° to 200° C. under 4 millimeters pressure and having a specific gravity of about 1.19 at 25°/20° C.

CLARENCE L. MOYLE.